United States Patent

[15] 3,638,820

Misu

[45] Feb. 1, 1972

[54] VACUUM BOTTLE

[72] Inventor: Sadayuki Misu, 2-12, Ohtsukacho 3-chome, Takatsuki, Osaka-fu, Japan

[22] Filed: Nov. 28, 1969

[21] Appl. No.: 880,761

[52] U.S. Cl. ............................................................215/13
[51] Int. Cl. .............................................................A47j 41/00
[58] Field of Search .............................222/131; 215/13, 13 A

[56] References Cited

UNITED STATES PATENTS

| 1,722,696 | 7/1929 | Fowler | 215/13 |
| 2,057,969 | 10/1936 | Payson et al. | 215/13 |
| 2,742,170 | 4/1956 | Bramming | 215/13 A |

*Primary Examiner*—Robert B. Reeves
*Assistant Examiner*—John P. Shannon, Jr.
*Attorney*—Wenderoth, Lind & Ponack

[57] ABSTRACT

A vacuum-type bottle having a single-layer glass bottle forming the liquid-receiving container thereof, and having a heat-reflecting layer on the outer surface thereof. The outer shell is positioned around the outside of the single-layer glass bottle and is spaced therefrom, and a heat-reflecting layer is positioned on the inner surface of the outer shell. The space between the glass bottle and the outer shell is evacuated. The heat-reflecting layers are separated from each other in the vicinity of the mouth portions of the glass bottle and the outer shell to prevent conduction of heat therebetween.

3 Claims, 6 Drawing Figures

PATENTED FEB 1 1972
3,638,820
SHEET 2 OF 2
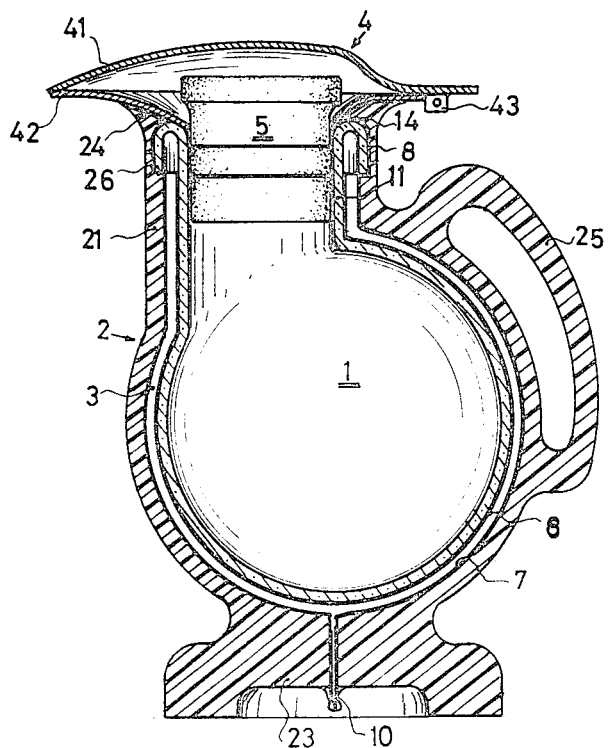
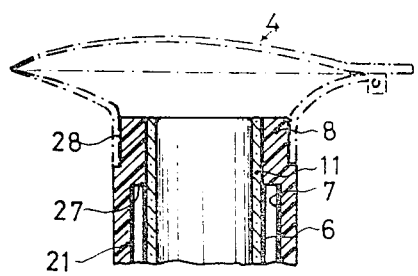
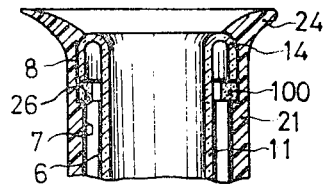
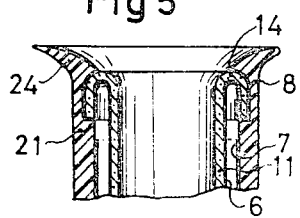
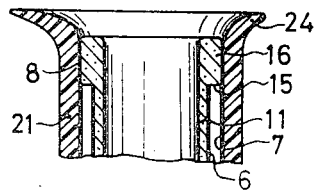
*Inventor*
SADAYUKI MISU
*By* Wendworth, Lind & Ponack
*Attorney*

VACUUM BOTTLE

The present invention relates to improvements in vacuum bottle.

The conventional vacuum bottle comprises two spaced inner and outer, cylindrical bottles, with the opposed surfaces of said spaced glass bottles being silver-plated, the clearance therebetween being highly evacuated, and a sheath made of metal, plastics or the like arrange outside the outer glass bottle.

The production of such conventional vacuum bottles involves the steps of separately manufacturing the inner and the outer cylindrical glass bottles, severing the outer glass bottle into two, upper and lower pieces at the cylindrical portion thereof, putting these glass bottles together with a spacer interposed therebetween, joining the inner and the outer glass bottles together at the mouth portions thereof, joining said two pieces together to form a unitary body, carrying out a chemical treatment by injecting a slurry of silver compound into the clearance between the inner and the outer glass bottles through an evacuating tip to form a thin layer of silver deposited on the opposed surfaces of the inner and the outer glass 134 inner and outer glass bottles, and finally evacuating said clearance. Therefore, the heat-reflecting layers (thin layers of silver) on the inner and the outer glass bottles extend continuously from the inner to the outer glass bottle and the outer surface of said spacer is also formed with a heat-reflecting surface of silver, resulting in the disadvantage that heat is dissipated from the inner to the outer glass bottle through the heat-reflecting layer at the junction of the mouth portions of the inner and outer glass bottles and through the heat-reflecting layer on the spacer. Moreover, the fact that the glass bottles are double leads to other disadvantages that many manufacturing steps and much time in manufacture are required and that the dimension of the whole vacuum bottle is large as compared with its substantial capacity.

The present invention has been accomplished to eliminate these disadvantages inherent in the conventional vacuum bottle. According to the invention, there is provided a vacuum bottle which is improved in the thermal efficiencies of warmth retention and coldness retention, simple in structure and manufacture and hence inexpensive and small in size and yet has a large capacity as compared with its size.

The basic feature of the invention resides in using a single-layer glass bottle instead of the conventional double glass bottle, applying a heat-reflecting layer to the outer surface thereof, placing an outer shell outside said glass bottle with a clearance defined therebetween, applying a heat-reflecting layer also to the inner surface of said outer shell, evacuating said clearance, establishing discontinuation between the heat-reflecting layer on said glass bottle and the heat-reflecting layer on said outer shell in the vicinity of the junction of the mouth portions of the glass bottle and outer shell thereby preventing a conduction of heat from the single-layer glass bottle to the outer shell at such region of discontinuity.

Such region for discontinuation of heat-reflecting layers is provided by leaving a portion of the glass bottle or of the outer shell naked of a heat-reflecting layer in the vicinity of the junction between the glass bottle and the outer shell, or by interposing a packing or spacer having no heat-reflecting layer applied thereto between the opposed surfaces of the glass bottle and outer shell at said junction or by other suitable means.

According to another feature of the invention, the single-layer glass bottle is substantially spherical to make the capacity large as compared with the area of its outer surface, thereby dissipation of heat (in the case of warmth retention) and absorption of heat (in) the case of coldness retention) are substantially decreased as compared with its capacity.

According to a further feature of the invention, the single-layer glass bottle and the outer shell are firmly joined together only at the mouth portions and no spacer is placed in the clearance, so that there is no heat conduction through the spacer and hence warmth retention and coldness retention can be effectively achieved.

The invention will now be described in more detail with reference to preferred embodiments thereof shown in the accompanying drawings.

In the drawings:

FIG. 2 is a vertical axial sectional view of another embodiment of the invention; and FIGS. 3 through 6 are vertical axial sectional views each showing only the mouth portion of the vacuum bottle and showing a different manner of providing the region of discontinuity of the heat-reflecting layer. It is to be noted that like reference numerals indicate like parts throughout the FIGS.

Figure 1:
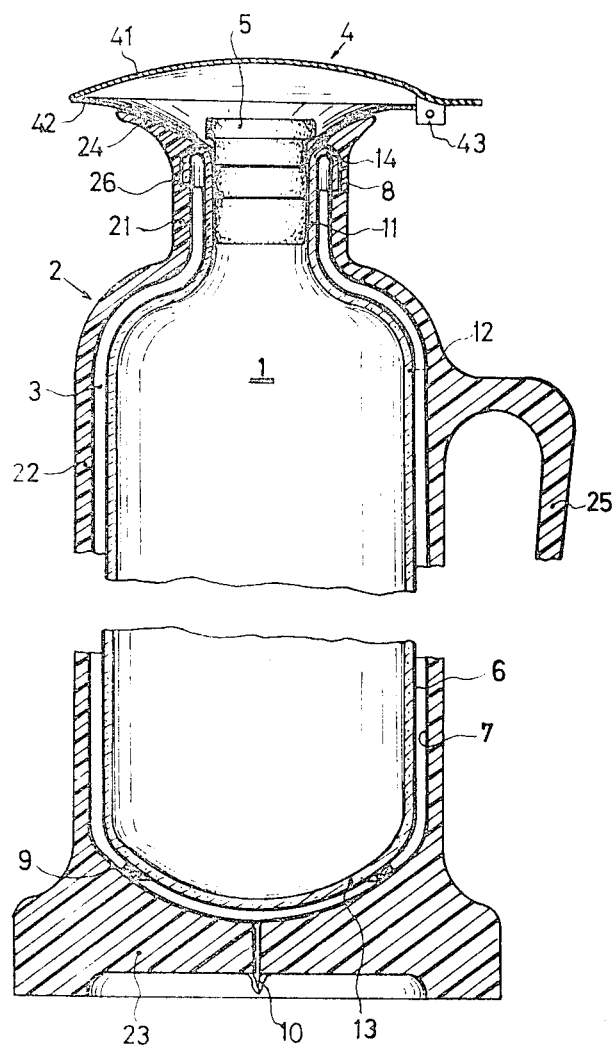
FIG. 1 is a vertical axial sectional view of an embodiment of the invention.

Referring to FIG. 1, there is shown a vacuum bottle of generally conventional shape but to which the invention has been applied. In FIG. 1, the numeral 1 designates a heat-resisting glass bottle of conventional shape having an upper mouth portion 11, an elongate cylindrical portion 12 and a substantially spherical bottom portion 13. The mouth portion 11 of the glass bottle is bent outwardly in U-shape as indicated at 14 for the purposes to be later described. The glass bottle may be made of any vitreous material, but it is desirable from the viewpoint of mechanical strength that it is made of tempered glass. The numeral 2 designates an outer shell surrounding the glass bottle 4, with an evacuated clearance defined therebetween, which outer shell, depending on the shape of the glass bottle, comprises a mouth portion 21, an elongate cylindrical portion 22 and a bottom portion 23. Further, the outer shell has a seat portion 24 for seating and fixing a lid structure 4. The lid structure consists of an upper lid 41 and a lower lid 42, said upper lid 41 is pivotable around the axis of a pivot 43. Such lid structure 4 and the seat portion of the outer shell 2 for supporting the same do not form a part of the invention and therefore a further detailed explanation thereof will be omitted. The numeral 25 designates a handle for holding the vacuum bottle by hand. The numeral 5 designates a solid plug. As for such plug, various ones are proposed and any of them may be used.

The inner surface of the mouth portion 21 of the outer shell 2 is provided with a shoulder 26, against which the U-shaped bent portion 14 of the glass bottle is abutted. The glass bottle 1 and outer shell 2 are firmly joined together along their mutually abutting portions including such shoulder 26. In this case said shoulder serves to hold the glass bottle 1 vertically.

A heat-reflecting layer 6 is applied to the outer surface of the glass bottle 1. The inner surface of the outer shell opposed to said heat-reflecting layer 6 is also provided with a heat-reflecting layer 7. Such heat-reflecting layers may be formed by plating (mostly by deposition by means of vacuum evaporation with silver, aluminum or other metal or by fixing a foil such as of silver or aluminum). It should be noted that the outwardly bent U-shaped portion 14 of the glass bottle has been no heat-reflecting layer applied thereto throughout the circumference. Therefore, the heat-reflecting layer 6 on the glass bottle 1 is not continuous to the heat-reflecting layer 7 on the outer shell. In other words, there is presented a region for discontinuation of heat-reflecting layers, so that direct heat conduction between the heat-reflecting layers 6 and 7 is prevented.

The numeral 9 designates a spacer made of a material of low heat conductivity such as asbestos, serving to stabilize the position of the glass bottle 4 within the outer shell 2, but such spacer may be omitted since the glass bottle 1 is firmly joined to the outer shell 2 at the mouth portions thereof.

In addition, the numeral 10 designates a tip for evacuating the clearance 3.

In order to fabricate such vacuum bottle, the glass bottle 1 having the heat-reflecting layer 6 applied thereto in advance is prepared. Further, the outer shell is prepared in a vertically halved form, and the heat-reflecting layer 7 is applied to the inner surface thereof in advance. The two halves of the outer shell are then brought to the opposed sides of the glass bottle 1 in a sandwich fashion and joined together by any suitable means. Further, the glass bottle 1 and the outer shell 2 are joined together at the mouth portions by a suitable adhesive 8. Thereafter, the air in the clearance 3 is withdrawn through the tip 10 while circulating a hot gas at 400°–600° C. in the glass bottle 1, and upon the completion of the evacuation, the tip 10 is closed. The lid structure 4 is then fixed on the seat 24 by any suitable means. If necessary, a spacer 9 will be inserted in advance.

As is apparent from the above description, between the glass bottle 1 and the outer shell 2, a region for discontinuation of heat-reflecting layers is formed in the vicinity of the junction of their mouth portions, so that since direct heat conduction between the heat-reflecting layers 6 and 7 is avoided, the efficiencies of warmth retention and coldness retention are greatly improved as compared with the conventional vacuum bottle. Further, even if the spacer 9 is inserted, unlike the vacuum bottle of the conventional double glass bottle type, such spacer will in no case be undesirably formed with a heat-reflecting layer, so that heat conduction is substantially eliminated in this part and hence the efficiencies of warmth retention and coldness retention are further improved. Further, in the vacuum bottle of the invention, since the glass bottle is of single layer, there is obtained a merit that the number of manufacturing and fabricating steps is decreased and the number of parts is also decreased and hence the cost is correspondingly lowered.

As the material of the outer shell, there may be used shock-resistant low heat conductivity plastics such as polyesters, polystyrene and polycarbonates, metals and other suitable materials. For the joining of the glass bottle and outer shell and of the halves of the outer shell, there may be used, for example, a nonsolvent-type epoxy or cyanoacrylate adhesive.

FIG. 2 shows another embodiment of the invention. The difference of the embodiments of FIGS. 1 and 2 is that the glass bottle 1 in the embodiment of FIG. 2 is spherical. The use of such spherical glass bottle makes it possible to attain a maximum capacity while minimizing the outer surface area. Therefore, the efficiencies of warmth retention and coldness retention are improved more than in the embodiment shown in FIG. 1. In cases where such spherical glass bottle is used, it is preferable that the mouth portion 11 is provided substantially tangential to the glass bottle 1, as illustrated. Such arrangement makes it possible to pour out substantially all contents by tilting the vacuum bottle by 90° from its vertical position. In this embodiment shown in FIG. 2, it will also be seen that the U-shaped portion 14 of the mouth portion 11 of the glass bottle 1 has no heat-reflecting layer being applied thereto.

FIG. 3 shows another arrangement for presenting a region for discontinuation of the heat-reflecting layer between the heat-reflecting layer 6 on the glass bottle 1 and the heat-reflecting layer 7 on the outer shell 2. In the embodiment in FIG. 3, unlike the embodiments in FIGS. 1 and 2, the mouth portion 11 of the glass bottle 1 has no U-shaped bent portion, but it directly extends upwardly. Instead, the mouth portion 21 of the outer shell 2 is formed with a radial shoulder 27, which has no heat-reflecting layer being applied thereto. Thereby the region for discontinuation of the heat-reflecting layers is presented. The outer surface of the mouth portion 21 of the outer shell 2 is formed with a recess 28. The purpose of this recess is to enable the lid structure 4 such as shown in dot-dash lines to be fitted thereon.

In FIG. 4, a low heat conductive packing 100 such as of heat-resisting rubber (e.g., silicone rubber or fluorine-contained rubber) is interposed between the shoulder 26 of the mouth portion 21 of the outer shell and the U-shaped portion 14 of the mouth portion 11 of the glass bottle 1. Of course, the outer surface of the packing 100 has no heat-reflecting layer being applied thereto, so that the region for discontinuation of the heat-reflecting layers is presented by the packing.

FIG. 5 shows a modification of the embodiment shown in 1. In this embodiment of FIG. 5, the heat-reflecting layer 6 on the glass bottle 1 is provided throughout the U-shaped portion 14, whereas the portion of the outer shell 2 abutting against said U-shaped portion has no heat-reflecting layer being applied thereto. Thereby the region for discontinuation of the heat-reflecting layers is presented.

The embodiment shown in FIG. 6 is modification of the embodiment shown in FIG. 3. Whereas in the embodiment shown in FIG. 3 the outer shell 2 is formed with the shoulder 27 having no heat-reflecting layer applied thereto, in the embodiment shown in FIG. 6 the mouth portion of the glass bottle 1 is formed with an enlarged portion 16 having a shoulder 15, which shoulder 15 has no heat-reflecting layer being applied thereto. According to this embodiment, there is an additional merit that the mouth portion of the glass bottle is reinforced.

While only the mouth portion of the vacuum bottle has been shown in FIGS. 3 through 6, the portion lying therebelow may be cylindrical as shown in FIG. 1 or spherical as shown in FIG. 2.

If the structure of the mouth portion as shown in FIG. 3 or 6 is employed, it is possible to divide the outer shell 2 into two, upper and lower halves to enable surrounding the glass bottle.

In any of the embodiments described above, it is preferable to so arrange that the region for discontinuation of heat-reflecting layers assumes a position within the range of the plug 5 when the plug is applied. This is because, otherwise, absorption or dissipation of heat through the region for discontinuation of the heat-reflecting layers would take place, resulting in a reduction, though slight, in the efficiencies of warmth retention and coldness retention of the vacuum bottle.

Although the invention has been described above on the basis of particular embodiments, the invention is not limited to such embodiments. It is apparent that various modifications may be made by those skilled in the art without departing from the spirit of the invention. For example, the region for discontinuation of the heat-reflecting layers may be presented by providing both the glass bottle and the outer shell with a portion having no heat-reflecting layer applied thereto in the vicinity of the junction of the mouth portions.

I claim:

1. A vacuum bottle comprising a single-layer glass bottle having a heat-reflecting layer on the outer surface thereof, an outer shell having a heat-reflecting layer on the inner surface thereof and disposed outside said glass bottle with an evacuated space defined therebetween the outer surface of said glass bottle having no heat-reflecting layer in the vicinity of the junction of the mouth portions of the bottle and outer shell, thereby forming a discontinuation of the heat-reflecting layer.

2. A vacuum bottle comprising a single-layer glass bottle having a heat-reflecting layer on the outer surface thereof, an outer shell having a heat-reflecting layer on the inner surface thereof and disposed outside said glass bottle with an evacuated space defined therebetween the inner surface of said outer shell having no heat-reflecting layer in the vicinity of the junction of the mouth portions of the glass bottle and outer shell, thereby forming a discontinuation of the heat-reflecting layer.

3. A vacuum bottle comprising a single-layer glass bottle having a heat-reflecting layer on the outer surface thereof, an outer shell having a heat-reflecting layer on the inner surface thereof and disposed outside said glass bottle with an evacuated space defined therebetween the upper mouth portion of the glass bottle being bent outwardly in a U-shape, the outer shell being provided with a recess corresponding to and receiving said U-shaped portion, and a packing having no heat-reflecting layer thereon being interposed between the shoulder of said recess and said U-shaped portion.

* * * * *